Jan. 30, 1940. O. A. KING 2,188,719
BEEHIVE
Filed April 22, 1939 2 Sheets-Sheet 1
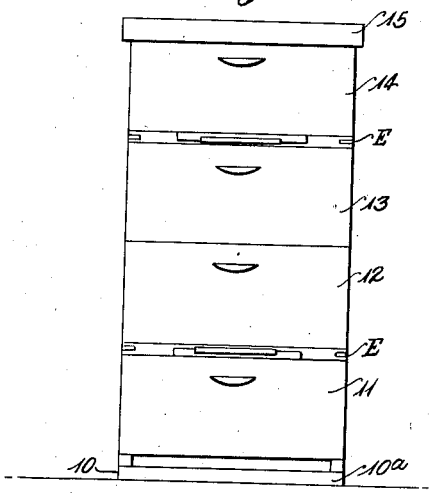
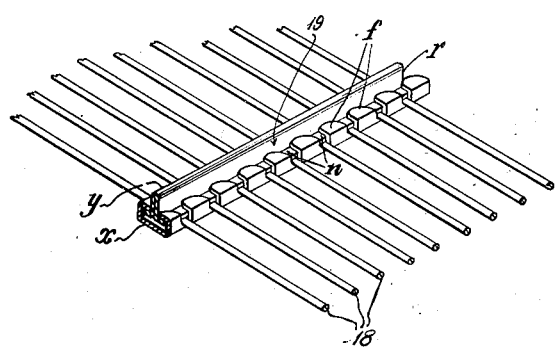
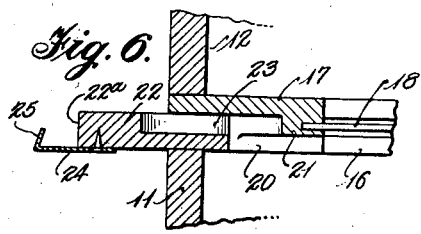
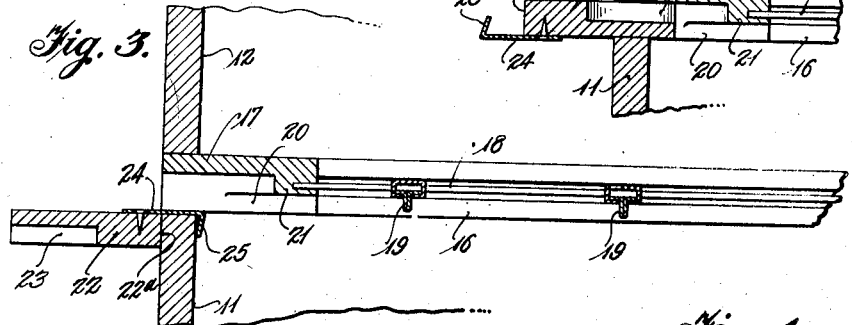
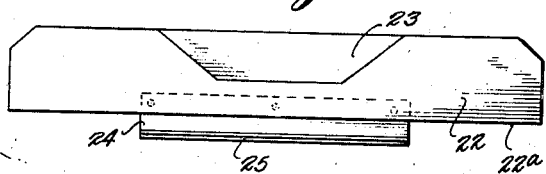
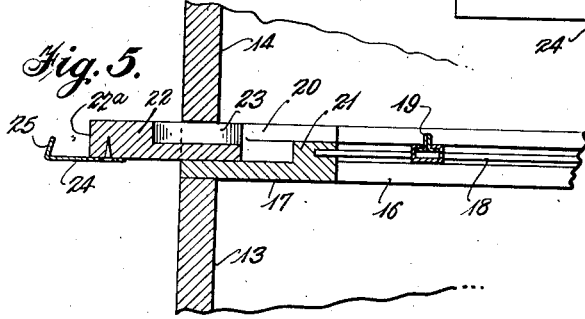
Inventor
Oral A. King
By
Attorney Jan. 30, 1940.     O. A. KING     2,188,719
BEEHIVE
Filed April 22, 1939     2 Sheets-Sheet 2
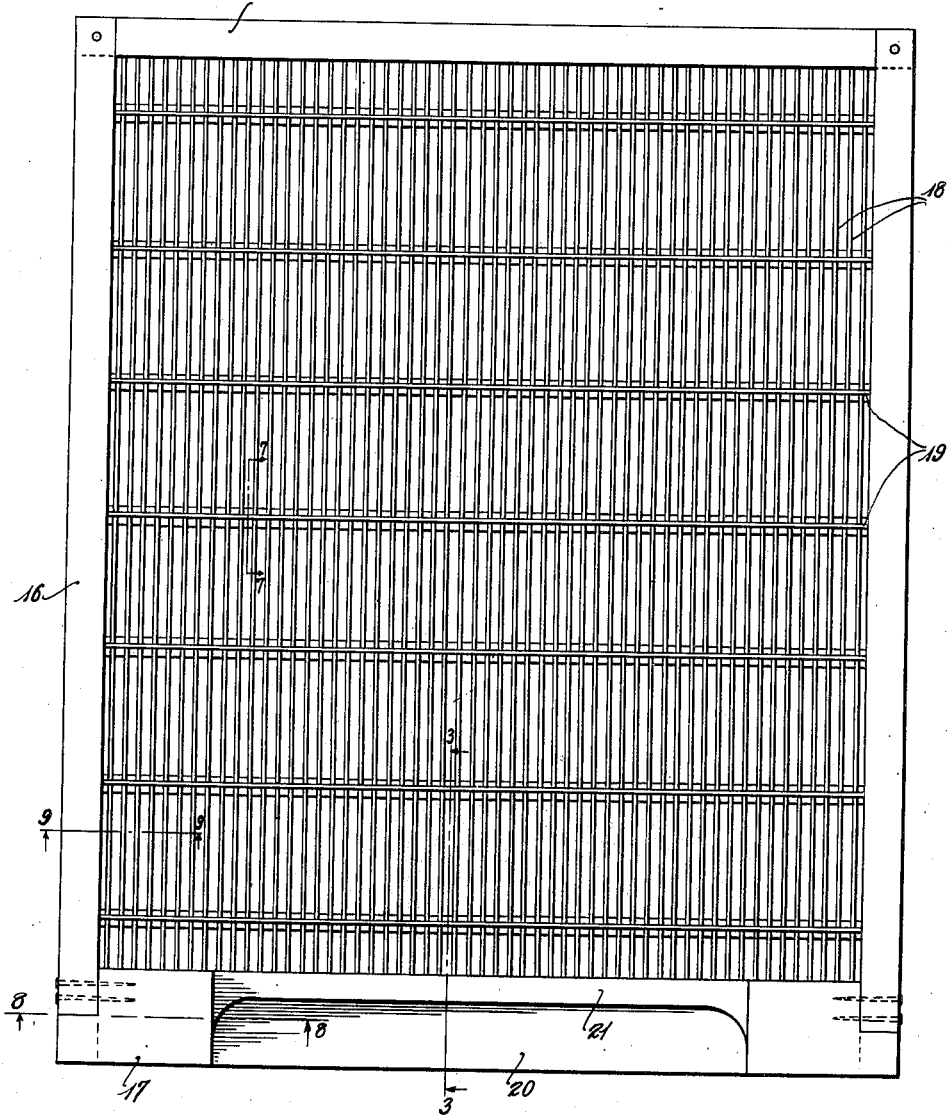
Fig. 2.
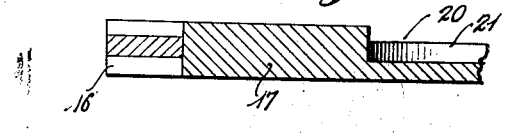
Fig. 8.
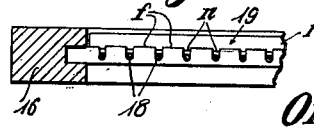
Fig. 9.
Inventor
Oral A. King
Attorney Patented Jan. 30, 1940

2,188,719

UNITED STATES PATENT OFFICE 2,188,719

BEEHIVE

Oral A. King, near Norfolk, Va.

Application April 22, 1939, Serial No. 269,537

5 Claims. (Cl. 6—4)

The present invention relates broadly to queen excluders, generally useful in beehives in connection with a single queen operated colony or with two or more queen colonies, such latter multi-queen operated colonies being established in any suitable manner such, as one example, by means of the separating board shown in my U. S. Letters Patent No. 2,128,000.

It has been discovered that an entrance immediately over the lower brood chamber is beneficial, inasmuch as it permits nectar carrying bees to enter the supers without having to work their way through a congested brood chamber, and those with pollen enter above the brood frames and store the pollen in cells just below the top bars.

The object of the invention is to provide a queen excluder which may be used at any convenient or desired place in a beehive above the lower brood chamber and which has an entrance opening therein permitting egress and ingress of bees to and from the hive. This entrance opening is so designed as to direct the ingress of bees into the hive above the queen excluder, in one position of the queen excluder, or below the excluder, in the other position of the excluder. The purpose of this arrangement, in either positions of the queen excluder, is to enable the nectar laden or pollen laden bees to unload their burden without the necessity of having to filter through a brood chamber in the case of a single queen operated colony or through the entire lower colony in the case of a two queen-bee operated hive, thus relieving congestion from the brood chambers and curtailing the tendency to swarm and enabling the colony or colonies to store a larger surplus of honey.

Another object of the invention is to provide a closure for the entrance opening in the queen excluder which may be operated to serve as an alighting-board and closure and which may be adjusted so as to control the number of bees that may move into or out of the hive through the opening, this alighting-board being such that it can be entirely removed from the opening to produce a larger entrance and at the same time serve as an alighting-board.

The above and other objects of the invention will be apparent as the following detailed description of the invention proceeds and the invention resides in the sundry details of construction, combination, and arrangement of parts herein defined and more particularly pointed out in the appended claims.

In the preferred construction of the invention as at present devised,

Fig. 1 is a front elevation of a beehive showing the present invention employed therewith in one manner or arrangement of its use;

Fig. 2 is a plan view of the queen excluder of the present invention;

Fig. 3 is a vertical sectional view of the excluder taken on line 3—3 of Fig. 2 and shown positioned between two chamber sections of a beehive with the closure for the entrance opening in the excluder removed and forming an alighting-board;

Fig. 4 is a top plan view of the combined closure and alighting-board for the queen excluder;

Fig. 5 is a view of the excluder similar to Fig. 2, but showing the combined alighting-board and closure in one position to control the ingress and egress of bees through the entrance opening of the excluder;

Fig. 6 is a similar view to Fig. 5 showing the excluder in reverse position and the manner in which the combined alighting-board and the closure may cooperate with the board in said reverse position;

Fig. 7 is a fragmentary detailed sectional view taken substantially on line 7—7 of Fig. 2 and showing the spacing and fastening means for the excluding rods of the excluder;

Fig. 8 is a detailed sectional view taken substantially on line 8—8 of Fig. 2; and Fig. 9 is a detailed sectional view taken substantially on line 9—9 of Fig. 2.

Referring to the beehive assembly, shown in Fig. 1, there is a bottom board 10, equipped with the usual alighting portion 10a, and on which rests a brood chamber 11. The brood chamber 11 may have superposed upon it one or more, so-called, super chambers 12 and 13 of any height for well-known purposes in bee keeping. The supers 12 and 13 may be closed at their top by a suitable cover for a single queen colony. However, in Fig. 1 the super 13 has an upper brood chamber 14 placed thereupon and which brood chamber is closed by a cover 15. Of course, it is understood that superchambers may be imposed upon the brood chamber 14, if desired, or any conventional arrangement of the various chambers made that will serve the beekeeper's practice. The present illustration is for the purpose of illustrating one example of the manner in which the present queen excluder may be employed.

In the arrangement shown in Fig. 1, two queen excluders E are employed in the manner shown, one immediately above the brood chamber 11 and another below the top brood chamber 14.

The queen excluder E of the present invention comprises a rectangular frame composed of side members 16 and end members 17 made of any suitable material, and whose outside dimensions conform with the outside dimensions of the chambers composing the hive. Therefore, the frame is designed to rest flatly upon the upper edges of the chamber on which it is superposed and to have the lower edges of the next upper chamber lie flatly upon it. If suitable interengaging means are desired or provided to hold the chambers together against accidental dislodgement, the frame members 16 and 17 also may be equipped with complemental portions for this purpose.

Extending between the end members 17 are rods 18 arranged in parallel relation in the same plane and spaced apart the distance of one bee space. The rods 18 are preferably of sturdy metallic wire, whose ends are imbedded in or extended into, or otherwise attached to, the end members 17.

Because of the importance of maintaining these rods 18 properly apart throughout their entire lengths to prevent queen bees from passing therebetween, there are provided spacing and reinforcing bars 19 at desired intervals along the lengths of the rods 18. The spacing bars 19 are, preferably, arranged from two to two and one-half inches apart in order to insure the permanent spacing of the rods 18 from injury during the handling and storing. The spacing bars 19 are of particular advantage, because of their construction which eliminates the necessity of soldering or welding, and consist of sheet metal parts which may be bent or pressed into position.

Each spacing bar 19 comprises two parts $x$ and $y$. The part $x$ is an elongated strip of metal having its longitudinal side edges provided with a series of notches $n$, each of a width to receive and accommodate a rod 18. The notches are properly spaced apart and the notches on one longitudinal edge are in alignment with the notches on the other longitudinal edge. The fingers $f$, formed between the edges are bent at right angles with respect to the strips $x$.

The strip $x$ is then placed across the excluder rods 18 so as to occupy the notches between the fingers $f$. The part $y$ of the bar 19 comprises an elongated strip of metal bent to substantially T-shape to provide a reinforcing rib $r$ and is placed transversely of the rods 18 on the opposite sides of the rods from that occupied by the strip $x$ and is positioned between the fingers $f$ on opposite longitudinal edges of the strip $x$. The fingers $f$ are then pressed downwardly against oppositely flanged portions of the strip $y$, thus locking the bar 19 in position on the rods 18 and positively maintaining the rods 18 in spaced relation.

At least one end member 17 of the frame has one of its side surfaces cut away to provide a recess or slot 20 forming an entrance opening through which bees may have ingress and egress with respect to the hive. The recess or slot 20 has, however, at the inner edge of the frame end member 17, a laterally extending ledge or boss 21 which extends for a distance into the slot 20 to reduce the area of the slot at said inner edge thereof and to act as a stop for a closure 22. The slot 20 extends for a considerable distance of the length of the end member 17 so as to provide an entrance opening of considerable area.

A closure member 22 is provided and is of such dimensions as to slidably fit into and occupy that portion of the slot 20 outwardly of the boss or ledge 21. One side face of the closure 22 is cut away for a distance inwardly from one edge of the closure, as at 23. This cut away portion 23 is, preferably, V-shaped or has its side walls converging inwardly to allow for a graduated regulation of the size of the entrance to and from the hive as will later be apparent. The depth of the cut away portion 23 is that of one bee space and may be of any desired length at the edge of the closure. When the closure is in said entrance opening 20, as shown in the drawings, it either may close the opening entirely or by sliding it a distance inwardly or outwardly will provide a reduced entrance opening of different areas, thus conrolling the number of bees that may enter into or exit from the hive at one time.

The other longitudinal edge closure 22 is provided with a clip member 24 in the form of a metal strip extension having one edge secured to the closure 22 and projecting outwardly beyond said edge and having its outer extremity 25 bent laterally therefrom to form a gripping finger or hook which will cooperate with the wall or edge 22a of the closure 22 to straddle and grip a wall of a hive chamber, as shown in Fig. 3.

When the queen excluder is used immediately over a brood chamber, such as over the chamber 11 shown in Fig. 1, it is preferred that the excluder be placed in the position shown in Fig. 3—that is, with the entrance opening 20 communicating with the chamber 11 below the excluder rod 18 so that the bees are allowed to enter beneath the excluder rod 18—and, when used beneath an upper brood chamber, such as the brood chamber 14 in Fig. 1, it is preferred that the excluder be placed in the position shown in Fig. 5 so as to allow the bees to enter the chamber 14 above the excluder bars 18, thus enabling nectar laden bees to discharge their burden in the comb cells of the supers without requiring them to filter through the crowded brood chamber. By this arrangement confusion is relieved from the brood chamber and curtails the tendency of the bees to swarm. With the freedom with which the worker bees can operate, it is conducive to the production of greater surplus of honey.

The idea of the present invention is to incorporate in a queen excluder a novel means which will enable the worker bees readily to enter and exit from a hive adjacent the portions thereof where their nectar or pollen is to be stored and without the necessity of filtering through the crowded brood chamber. Therefore, any arrangement or use of the excluder, which best serves the individual desires or purposes of its user, is contemplated by the present construction.

The closure 22 is designed to function with equal facility in either position which the user of the excluder desires. If it is desired to leave the entrance opening 20 unobstructed, the closure 22 is placed in the position shown in Fig. 3 by hooking the member 24 over the top edge of the chamber immediately below the excluder so that the major portion of the closure will form an alighting board or platform.

If it is desired to close the entrance 20 against ingress or egress of the bees, the closure is placed in the entrance opening as shown in Figs. 5 and 6 and is moved inwardly to a position where it abuts the stop 21 so that the cut-out or recessed portion 23 thereof will lie wholly within the hive. If it is desired to open the entrance 20 to allow a restricted number of bees to move in and out of the hive, the closure may be slid to any one of several positions as indicated in Figs. 5 and 6 so as to permit the recess 23 to extend beyond the exterior surface of the hive. In these latter mentioned positions of the closure 20 the portion of the closure projecting beyond the hive will function as an alighting board and hook 25 will serve as a finger piece for effecting said adjustment.

Having thus described the invention and the manner in which the same is to be performed, it is to be understood that the invention is not to be limited to the exact structural details as defined and shown because the same may be modified and varied within the scope of the present invention, as expressed by the appended claims.

What is claimed is:

1. As an improvement in beehive appliances, a queen excluder comprising a rectangular frame to be interposed between chambers of a beehive, means supported by and within the confines of said frame for permitting worker bees to pass therethrough and for preventing the queen bee from passing therethrough, one member of the frame being provided with a slot extending from the exterior of the frame to the interior thereof on one side of said excluding means and serving normally as a bee passage, a member slidably and removably fitted in said slot to serve as a combined entrance closure and alighting board, said closure member being provided with means whereby, when said closure is slid outwardly from the slot for a distance, the said slot is opened to the ingress and egress of bees and projects beyond the exterior of the frame to form an alighting board and, when slid to its innermost position, closes said slot.

2. As an improvement in beehive appliances, a rectangular frame to be interposed between superposed chambers of a beehive and having substantially the same external dimensions as said chambers, one member of the frame being provided with a slot extending from the exterior of the frame to the interior thereof and serving normally as a bee passage, a member slidably and removably fitted in said slot to serve as a combined entrance closure and alighting board, said closure member being provided with means whereby, when said closure is slid for a distance to a position in the slot, the said slot is opened to the ingress and egress of bees and projects beyond the exterior of the frame to form an alighting board and, when slid to another position, closes said slot.

3. An improvement in beehive appliances as set forth in claim 2 further characterized by the said means in the closure member, for permitting ingress and egress of bees in certain of its positions, being a cut-out portion forming a recess in one side surface of the closure, said recess extending for a distance inwardly from an edge of the closure and having its side walls converging inwardly from said edge.

4. As an improvement in beehive appliances, a rectangular frame to be interposed between superposed chambers of a beehive and having substantially the same external dimensions as said chambers, one member of the frame being provided with a slot extending from the exterior of the frame to the interior thereof and serving normally as a bee passage, a member removably fitted in said slot to serve as a combined entrance closure and alighting board, said closure is provided with means by which it may be attached to the hive immediately below said slot in the frame, when removed from said slot, to provide an alighting board for bees.

5. An improvement in beehive appliances as set forth in claim 2 further characterized by the closure having on one edge thereof a hook-like member, which will overhang an edge of a hive chamber immediately below said frame and the entrance therein when said closure is removed from said slot and reinserted to form an alighting board.

ORAL A. KING.